United States Patent [19]
Mentzer et al.

[11] Patent Number: 5,930,027
[45] Date of Patent: Jul. 27, 1999

[54] DIGITALLY CONTROLLED FIBER OPTIC LIGHT MODULATION SYSTEM

[75] Inventors: Carl A. Mentzer, Poway, Calif.; Michael C. Cates; Henry B. Morris, both of Mesa, Ariz.

[73] Assignee: McDonnell Douglas Corporation, St. Louis, Mo.

[21] Appl. No.: 09/022,980

[22] Filed: Feb. 12, 1998

[51] Int. Cl.⁶ .................................................. G02B 26/08
[52] U.S. Cl. ...................... 359/298; 359/223; 359/290; 359/295; 385/31
[58] Field of Search ............................. 385/31; 359/223, 359/224, 290, 291, 295, 318, 298

[56] References Cited

U.S. PATENT DOCUMENTS

| | | | |
|---|---|---|---|
| 4,601,537 | 7/1986 | Saccocio | 350/96.27 |
| 4,849,940 | 7/1989 | Marks, II et al. | 365/215 |
| 4,856,863 | 8/1989 | Sampsell et al. | 350/96.16 |
| 5,033,814 | 7/1991 | Brown et al. | 350/96.24 |
| 5,037,173 | 8/1991 | Sampsell et al. | 385/17 |
| 5,199,088 | 3/1993 | Magel | 385/18 |
| 5,239,598 | 8/1993 | Wight et al. | 385/8 |
| 5,247,600 | 9/1993 | Williams et al. | 385/115 |
| 5,345,521 | 9/1994 | McDonald et al. | 385/19 |
| 5,379,358 | 1/1995 | Blyler, Jr. et al. | 385/16 |
| 5,442,411 | 8/1995 | Urbanus et al. | 348/771 |
| 5,504,575 | 4/1996 | Stafford | 356/330 |
| 5,517,347 | 5/1996 | Sampsell | 359/224 |
| 5,524,155 | 6/1996 | Weaver | 385/24 |
| 5,544,268 | 8/1996 | Bischel et al. | 385/4 |
| 5,640,479 | 6/1997 | Hegg et al. | 385/120 |

*Primary Examiner*—Georgia Epps
*Assistant Examiner*—Margaret Burke
*Attorney, Agent, or Firm*—Westerlund & Powell, P.C.; Robert A. Westerlund; Raymond H. J. Powell, Jr.

[57] ABSTRACT

A fiber optic spatial light modulation system which includes a light source which produces source light, an optical fiber bundle which includes a plurality of individual optical fibers, and a spatial light modulator which is interposed between the light source and the optical fiber bundle, and which selectively modulates the amount of the source light coupled into each of the individual optical fibers, wherein the amount of the source light coupled into different ones of the individual optical fibers can be unequal. In the disclosed embodiment, the spatial light modulator is a digital micromirror device which includes an array of micromirrors, a semiconductor memory which includes an array of memory cells, wherein each of the memory cells is associated with a respective one of the micromirrors and stores a bit of binary data, and the system employs a digital microprocessor which executes a desired control algorithm and sends the binary data to appropriate ones of the memory cells to selectively drive the micromirrors into an on position or an off position in accordance with the binary value of the binary data. Each of the individual optical fibers has associated therewith a plurality of micromirrors which are each oriented to couple the source light into the corresponding individual optical fiber when in the on position and to not couple the source light into the corresponding individual optical fiber when in the off position.

19 Claims, 3 Drawing Sheets

DIGITALLY CONTROLLED FIBER OPTIC LIGHT MODULATION SYSTEM

BACKGROUND OF THE INVENTION

The present invention relates generally to optical fiber-based spatial light modulation systems such as are utilized in real-time display systems, laser and fiber optic communications systems, commercial lighting systems, laser surgery, and other applications. The present invention relates more particularly to a fiber optic spatial light modulation system in which the optical power launched into individual fibers of an optical fiber bundle is digitally controlled to thereby enable precise control of the total optical power transmitted by the bundle to a remote site and/or precise control of the optical intensity pattern transmitted by the bundle to the remote site.

Real-time display systems based on spatial light modulators (SLMs) have been developed. An exemplary real-time display system for large screen projection televisions uses a digital micromirror device (DMD) as a spatial light modulator between a light source and a display optics system that includes a projection lens. DMDs manufactured by Texas Instruments and Hughes Aircraft (Raytheon) are commercially available. A DMD includes a static random access memory (SRAM) and an array of micromirrors suspended above the SRAM. There is a one-to-one correspondence between the memory cells of the SRAM and the micromirrors. Each micromirror and its corresponding memory cell comprise an individually addressable pixel element. Each micromirror can be tilted to either plus or minus 10 degrees (i.e., ±10°) about a torsion axis depending upon the binary value (either "1" or "0") of the data bit stored in the corresponding memory cell. Each micromirror either reflects or does not reflect incoming light from the light source (i.e., it is either "on" or "off") into the projection optics, depending upon its tilt angle. The micromirrors that are tilted to the on position reflect the incoming light through the projection lens and onto a screen, and the micromirrors that are tilted to the off position reflect the incoming light away from the projection lens to be trapped, to thereby produce a desired spatial image on the screen.

Shades of gray can be achieved by appropriately modulating the proportion of time is during each video frame that each micromirror is in the on position, e.g., a micromirror which is in the on position for zero time during a video frame produces black for the corresponding pixel on the display screen, and a micromirror which is in the off position for 100% of the time during a video frame produces white for the corresponding pixel on the display screen. Color may be added by either using a color wheel or by using a triad of DMDs for each pixel element. Illustrative DMDs and display systems incorporating the same are disclosed in U.S. Pat. Nos. 5,517,347 and 5,442,411 which are both assigned to Texas Instruments and which are both incorporated herein by reference.

In conventional fiber optic light distribution or modulation systems, a plurality of light sources are provided for a corresponding plurality of respective optical fiber bundles (cables) which feed light to different sections of the system. Spatial light modulation is achieved by independently modulating the intensity of the light sources. Thus, the intensity of the light launched into all of the optical fibers of each fiber bundle is identically modulated. In order to provide adequate variegation across the system (i.e., adequate spatial light modulation), the required number of fiber bundles may be relatively large, which, in turn, results in a large number of both light sources and light modulators. The size, cost, complexity, and limited spatial light modulation characteristics of the conventional fiber optic light distribution systems constitute significant drawbacks and shortcomings.

Based on the above and foregoing, it can be appreciated that there presently exists a need in the industry for a fiber optic light modulation system which overcomes the above-described drawbacks and shortcomings of the conventional fiber optic light modulation system. The present invention fulfills this need in the industry.

SUMMARY OF THE INVENTION

The present invention overcomes the drawbacks and shortcomings of the conventional fiber optic light distribution systems by utilizing a DMD interposed between a light source and an optical fiber bundle (cable) in order to facilitate precise digital control of the intensity (amount) of the source light (optical power) launched into each individual optical fiber of the fiber bundle.

In one of its aspects, the present invention encompasses a fiber optic spatial light modulation system which includes a light source which produces source light, an optical fiber bundle which includes a plurality of individual optical fibers, and a spatial light modulator which is interposed between the light source and the optical fiber bundle, and which selectively modulates the amount of the source light coupled into each of the individual optical fibers, wherein the amount of the source light coupled into different ones of the individual optical fibers can be unequal.

In the disclosed embodiment, the spatial light modulator is a digital micromirror device which includes an array of micromirrors, a semiconductor memory which includes an array of memory cells, wherein each of the memory cells is associated with a respective one of the micromirriors and stores a bit of binary data, a digital microprocessor which executes a desired control algorithm and sends the binary data to appropriate ones of the memory cells to selectively drive the micromirrors into an on position or an off position in accordance with the binary value of the binary data of the respective memory cells. Each of the individual optical fibers has associated therewith a plurality of micromirrors which are each oriented to couple the source light into the corresponding individual optical fiber when in the on position and to not couple the source light into the corresponding individual optical fiber when in the off position.

The present invention encompasses, in another of its aspects, a method of spatially modulating source light from a light source which includes the steps of producing control signals, and using the control signals to selectively modulate the amount of the source light coupled into each of a plurality of individual optical fibers in an optical fiber bundle, wherein the amount of the light coupled into different ones of the individual optical fibers can be unequal.

BRIEF DESCRIPTION OF THE DRAWINGS

These and other objects, features, and advantages of the present invention will become readily apparent from the following detailed description taken in conjunction with the accompanying drawings, in which.

DETAILED DESCRIPTION OF THE INVENTION

Figure 1:
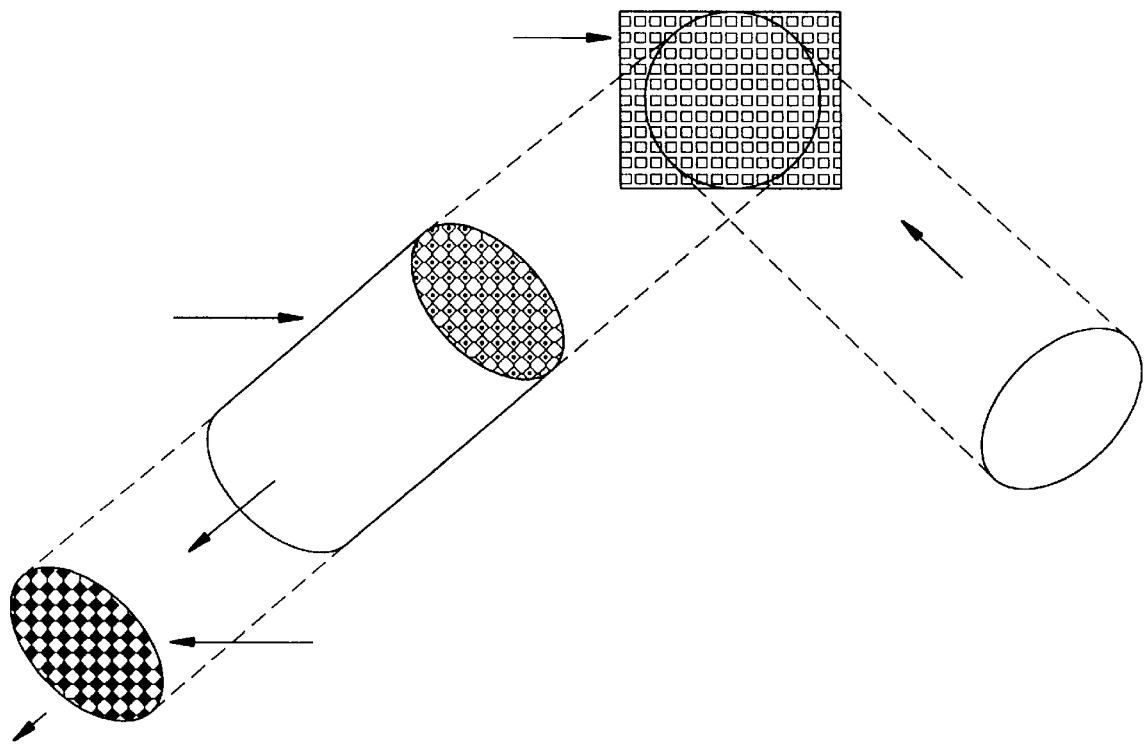
FIG. 1 is a diagram which depicts a fiber optic spatial light modulation system constructed in accordance with a preferred embodiment of the present invention.

With reference now to FIG. 1, there can be seen a fiber optic light modulation system 20 constructed in accordance with a preferred embodiment of the present invention. The light modulation system 20 includes a light source 22, an optical fiber bundle or cable 24, and a DMD (digital micromirror device) 26 interposed between the light source 22 and the fiber bundle 24. The light source 22 is preferably a collimated light source, which can be a broadband source such as an arc or incandescent lamp, or a narrowband source such as an expanded laser beam. The optical fiber bundle 24 can include a multiplicity (e.g., 100–500) of individual optical fibers 25.

Currently, Texas Instruments manufactures three different DMDs: namely, a first one having a 768×576 array of micromirrors; a second one having a 848×600 array of micromirrors; and, a third one having a 2048×1152 array of micromirrors. In all three DMDs, the micromirrors are 16 $\mu$m×16 $\mu$m in size, and are separated by 1 $\mu$m on all sides (thus, the micromirrors have a 17 $\mu$m×17 $\mu$m center-to-center "footprint").

Figure 2:
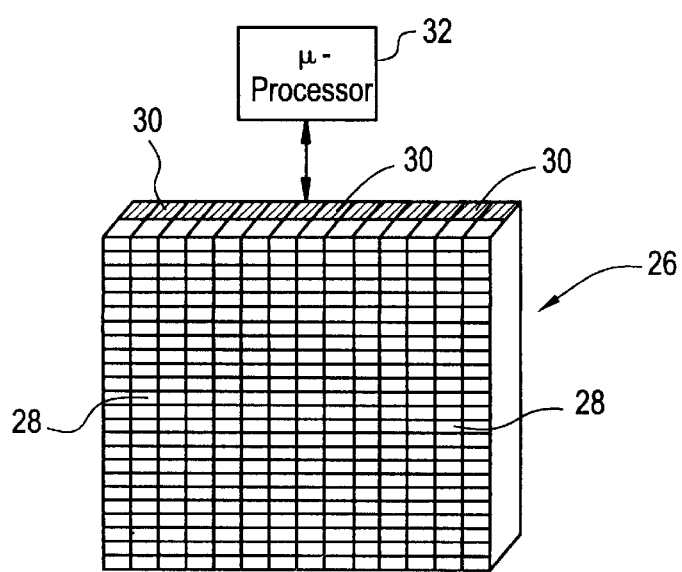
FIG. 2 is a diagram which depicts a digital micromirror device which is incorporated in the fiber optic spatial light modulation system depicted in FIG. 1.

As was previously described and as is shown diagrammatically in FIG. 2, each micromirror 28 of the DMD 26 is coupled to a corresponding SRAM memory cell 30. The binary value ("1" or "0") of the data bit stored in each SRAM memory cell 30 controls the tilt angle (±10°), and thus, the "on" or "off" state, of the corresponding micromirror 28. A microprocessor 32 can be utilized to control the "spatial pattern"(pattern of "1s" and "0s") stored in the array of SRAM memory cells 30 of the DMD 26 in accordance with user-inputted and/or software-generated spatial light modulation instructions/data (e.g., a desired control algorithm), to thereby produce a desired spatial light pattern 40 at the output of the optical fiber bundle 24. As will be easily recognized by those skilled in the pertinent art, such spatial patterns can be readily modulated at a frequency of 30 Hz or greater.

Figure 3A:
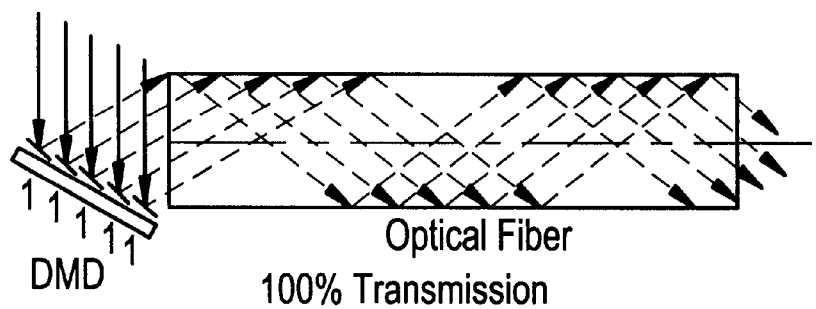
FIGS. 3A–3C depict three examples of spatial light modulation that can be achieved using the fiber optic spatial light modulation system depicted in FIG. 1; and, FIG. 4 depicts an exemplary DMD-optical fiber orientation for launching light into the optical fiber at an angle of 20° with the source light being directed normal to the fiber axis.
Figure 3B:
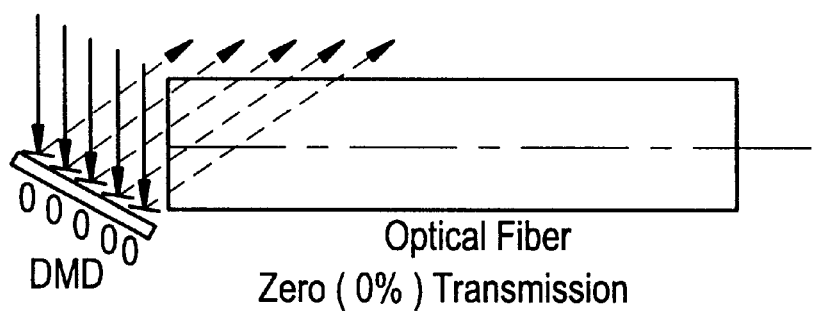
Figure 3C:
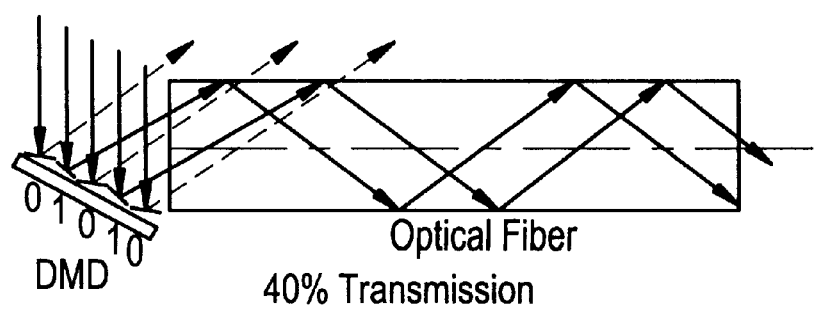

In accordance with the preferred embodiment of the present invention, a plurality of the micromirrors 28 of the DMD 26 are configured to modulate the intensity of the light from the light source 22 (i.e., the optical power) coupled or launched into each individual optical fiber 25 of the fiber bundle 24. This is depicted in FIGS. 3A–3C, which illustrate three simple examples of the spatial light modulation that can be achieved in this manner. In each example, the DMD 26 is oriented with respect to the collimated light source 22 and the fiber bundle 24 such that only light reflected from those micromirrors that are in their on position (i.e., oriented at a tilt angle of +10°) is within the acceptance angle of the corresponding optical fiber (~28° with respect to the fiber axis), so that only this light will be launched into that optical fiber and be transmitted therethrough to an illumination node. Light which is reflected from those micromirrors that are in their off position (i.e., oriented at a tilt angle of −10°) will not be launched into that optical fiber because the launch angle exceeds the acceptance angle of that fiber. Thus, by digitally controlling the number (fraction) of micromirrors that are in their on position, the optical power (watts) launched into and transmitted by each individual optical fiber 25 can be very accurately/precisely and reproducibly controlled.

In the example illustrated in FIG. 3A, five (5) micromirrors 28 all driven to their "on" position are used to launch approximately 100% of the incoming light (from the light source 22) into the optical fiber 25 for transmission therethrough. In the example illustrated in FIG. 3B, five (5) micromirrors 28 all driven to their "off" position are used to launch 0% of the incoming light into the optical fiber 25 for transmission therethrough. In the example illustrated in FIG. 3C, five (5) micromirrors 28, three of which are driven to their "off" position and two of which are driven to their "on" position, are used to launch 40% of the incoming light into the optical fiber 25 for transmission therethrough.

The specific number of micromirrors 28 which are used for modulating the light launched into each individual optical fiber 25 of the fiber bundle 24 is dependent upon the desired gray-scale dynamic range and resolution, which is only limited by the relative dimensions of the micromirrors 28 (and the spacing therebetween) and the diameter of the individual optical fibers 25 of the fiber bundle 24. In this regard, small pixel dimensions enable the realization of wide gray-scale dynamic range.

Figure 4:
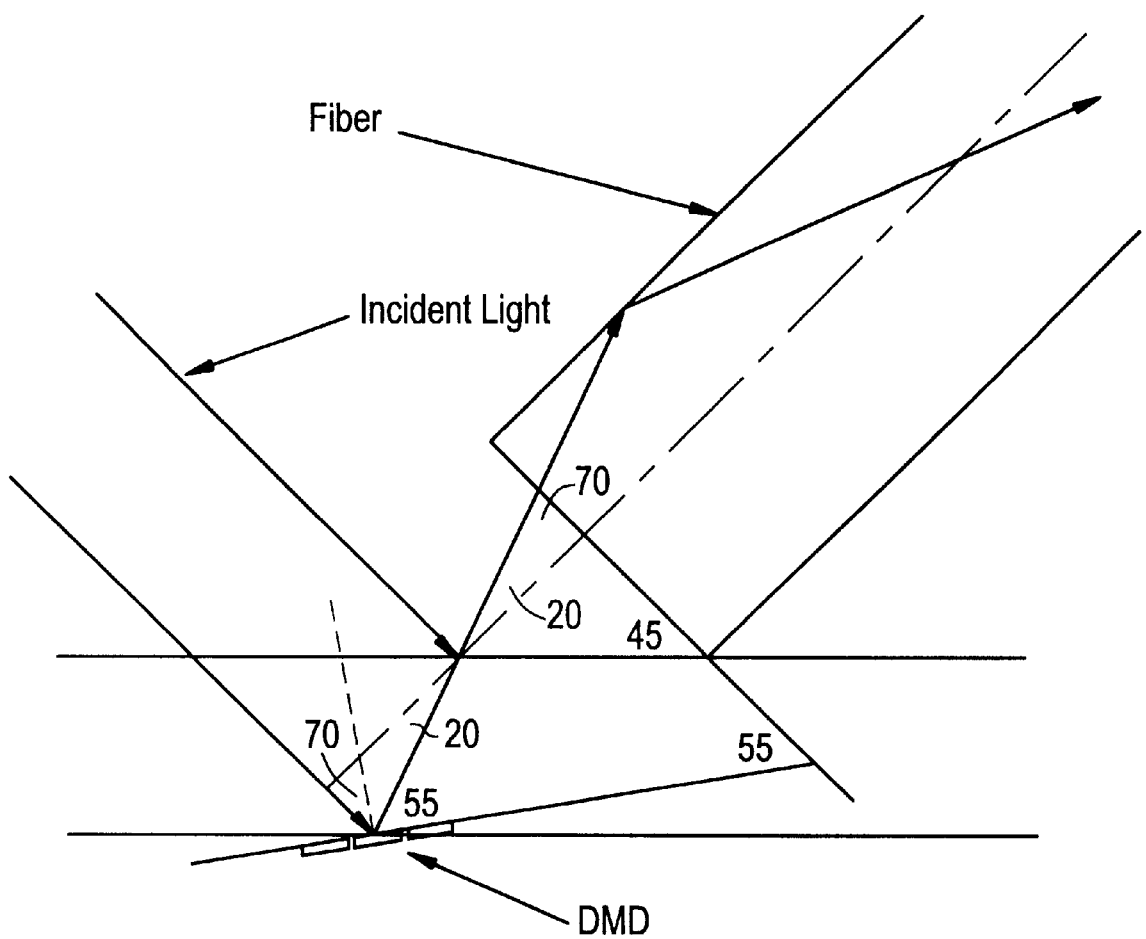

For example, for an implementation of the present invention in which a 786×576 Texas Instruments DMD and a trunk (root) optical fiber bundle having individual optical fibers with a 1 mm diameter are employed (with the face of the optical fibers being oriented at an angle of 55° with respect to the plane of the DMD—as depicted in FIG. 4), 2,640 micromirrors (pixels) spatially map onto each individual optical fiber (assuming a calculated fill circle to square fill factor of $\pi/4$). Thus, with this implementation, the DMD 26 can perform spatial light modulation for approximately 125 optical fibers ($576^2/2640=125.7$). Similarly, a 2048×1152 pixel DMD is capable of perfdorming spatial light modulation for at least 500 optical fibers ($1152^2/2600=510$). Of course, a larger number of smaller diameter optical fibers could be modulated, if desired. Thus, with this implementation, in principle, approximately 2,640-level gray scale modulation can be achieved (since from 1 to 2,640 micromirrors can be selectively used to couple light into a single optical fiber). This represents at least >11-bit ($2^{11}=2,048$) accuracy/precision and approximately 68 dB dynamic range. This is far better than can be achieved with the conventional analog control techniques.

It will be appreciated by those skilled in the pertinent art that if the trunk optical fiber bundle has a greater number of optical fibers (e.g., >510) than can be modulated by the DMD utilized, then one or more additional light sources and DMDs can be employed. It will also be appreciated by those skilled in the pertinent art that with high power laser and arc lamp light sources, it may be required that the DMD be air-cooled or mounted on a water-cooled plate in order to prevent overheating, which could cause the DMD (which is fabricated in a CMOS IC chip) to fail. With extremely high power light sources, cryogenic cooling with a thermoelectric or a closed-cycle Sterling refrigerator may be necessary. The heat dissipation in the DMD is the direct result of two factors, namely, the less than 100% reflectivity of the micromirrors, and the 12%–5% surface area of the DMD constituted primarily of the 1 $\mu$m gaps between the micromirrors which is nonreflective. The non-reflective surface area of the DMD absorbs a large fraction of the incident optical power, thereby resulting in heat build-up. Nevertheless, regardless of the power of the light source that is utilized in the practice of the present invention, cooling of the DMD is not a problem, since well-known cooling techniques are readily available for providing the necessary heat dissipation.

Many possible uses of the fiber optic light modulation system of the present invention will be readily apparent to those skilled in the pertinent art. For example, the fiber optic light modulation system of the present invention may be used in automotive, vehicular, aircraft, shipboard, industrial, scientific, diagnostic, medical, and communications applications. Other applications include laser power distribution for materials cutting, shaping, and processing in factories; laser surgery and therapy; emerging laser weapons systems. It appears likely that passenger cabin, cockpit and instrument panel lighting in both commercial and military aircraft (including helicopters) will employ optical fiber light distribution systems in the near future. Further, according to a recent article in *Photonics Spectra* (p. 96, June 1997), the automotive industry is investigating the use of optical fiber light distribution systems in automotive vehicles in the near future. Regardless of the particular application, it will be appreciated that the present invention achieves several significant advantages over the conventional fiber optic light modulation/distribution technology, including a reduction in system size, cost, and complexity, reduction in life cycle costs, and much improved performance and reliability, including much higher resolution and wider dynamic range gray scale modulation (e.g., highly accurate/precise and reproducible, digitally controlled light modulation).

In general, although the present invention has been described in detail hereinabove, it should be appreciated that many variations and/or modifications of the basic inventive concepts taught herein which may appear to those skilled in the pertinent art will still within the spirit and scope of the present invention as defined in the appended claims.

What is claimed is:

1. A fiber optic spatial light modulation system, comprising:

a light source which produces source light;

an optical fiber bundle which includes a plurality of individual optical fibers;

a digital micromirror device that includes a multiplicity of individual micromirrors organized as an array, with a different plurality of micromirrors being associated with each individual optical fiber; and, a digital controller that produces digital greyscale control data, wherein the digital micromirror device is responsive to the digital greyscale control data to selectively modulate the amount of the source light coupled into each of the individual optical fibers, at a frame rate, so as to produce a greyscale spatial pattern at the output of the optical fiber bundle without modulating the length of time during each frame period that each of the individual micromirrors is on or off.

2. The fiber optic spatial light modulation system as set forth in claim 1, wherein the digital micromirror device further includes a semiconductor memory that includes an array of memory cells, wherein each of the memory cells is associated with a corresponding one of the individual micromirrors and stores a respective bit of the digital greyscale control data.

3. The fiber optic spatial light modulation system as set forth in claim 2, wherein:

each of the individual micromirrors of the digital micromirror device are oriented to couple the source light into the corresponding one of the individual optical fibers when in an on position, corresponding to a first binary value of the bit of the digital greyscale control data stored in the corresponding memory cell; and, each of the individual micromirrors of the digital micromirror device are oriented to not couple the source light into the corresponding one of the individual optical fibers when in an off position, corresponding to a second binary value of the bit of the digital greyscale control data stored in the corresponding memory cell.

4. The fiber optic spatial light modulation system as set forth in claim 1, wherein the digital micromirror device is interposed between the light source and the optical fiber bundle.

5. The fiber optic spatial light modulation system as set forth in claim 1, wherein the source light is collimated.

6. The fiber optic spatial light modulation system as set forth in claim 4, wherein the source light is collimated.

7. The fiber optic spatial light modulation system as set forth in claim 2, wherein the digital greyscale control data is representative of the desired greyscale spatial pattern.

8. The fiber optic spatial light modulation system as set forth in claim 1, wherein the digital greyscale control data is representative of the desired greyscale spatial pattern.

9. The fiber optic spatial light modulation system as set forth in claim 1, wherein the light source comprises a single light source.

10. The fiber optic spatial light modulation system as set forth in claim 3, wherein the light source comprises a single light source.

11. The fiber optic spatial light modulation system as set forth in claim 3, wherein the fraction of the source light that is coupled into each individual optical fiber is digitally controlled by the binary values of the bits of the greyscale control data stored in the individual memory cells associated with the plurality of the individual micromirrors that are associated with that individual optical fiber.

12. The fiber optic spatial light modulation system as set forth in claim 11, wherein the fraction of the source light that is coupled into each individual optical fiber during each frame period is not varied.

13. The fiber optic spatial light modulation system as set forth in claim 12, wherein the fraction of the source light that is coupled into each individual optical fiber is varied at the frame rate.

14. The fiber optic spatial light modulation system as set forth in claim 13, wherein the light source comprises a single light source.

15. The fiber optic spatial light modulation system as set forth in claim 1, further including:

an additional light source which produces additional source light;

an additional optical fiber bundle which includes a plurality of additional individual optical fibers;

an additional digital micromirror device that includes a multiplicity of additional individual micromirrors organized as an array, with a different plurality of the additional individual micromirrors being associated with each additional individual optical fiber; and, wherein the additional digital micromirror device is responsive to the digital greyscale control data to selectively modulate the amount of the source light coupled into each of the additional individual optical fibers, at a frame rate, so as to produce an additional greyscale spatial pattern at the output of the additional optical fiber bundle without modulating the length of time during each frame period that each of the additional individual micromirrors is on or off.

16. The fiber optic spatial light modulation system as set forth in claim 15, wherein the greyscale spatial pattern and the additional greyscale spatial pattern are sub-parts of an overall greyscale spatial pattern.

17. The fiber optic spatial light modulation system as set forth in claim 14, wherein the fraction of the additional source light that is coupled into each additional individual optical fiber during each frame period is not varied.

18. The fiber optic spatial light modulation system as set forth in claim 17, wherein the fraction of the additional source light that is coupled into each additional individual optical fiber is varied at the frame rate.

19. The fiber optic spatial light modulation system as set forth in claim 18, wherein the light source and the additional light source are each single light sources.

* * * * *